(12) United States Patent
Blodau et al.

(10) Patent No.: US 11,365,278 B2
(45) Date of Patent: Jun. 21, 2022

(54) POLYURETHANE-BASED BINDER SYSTEM

(71) Applicant: Henkel AG & Co. KGaA, Duesseldorf (DE)

(72) Inventors: Marcel Blodau, Krefeld (DE); Andre te Poel, Willich (DE); Claudia Meckel-Jonas, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 15/791,582

(22) Filed: Oct. 24, 2017

(65) Prior Publication Data
US 2018/0044462 A1 Feb. 15, 2018

Related U.S. Application Data

(63) Continuation of application No. PCT/EP2016/058922, filed on Apr. 21, 2016.

(30) Foreign Application Priority Data

Apr. 28, 2015 (DE) .......................... 102015207792.6

(51) Int. Cl.
| | | |
|---|---|---|
| *C08G 18/12* | (2006.01) | |
| *B32B 7/12* | (2006.01) | |
| *C08G 18/50* | (2006.01) | |
| *C08G 18/76* | (2006.01) | |
| *C08G 18/48* | (2006.01) | |
| *C09J 175/12* | (2006.01) | |
| *B32B 27/06* | (2006.01) | |
| *B32B 27/40* | (2006.01) | |
| *B32B 7/00* | (2019.01) | |
| *C08G 18/32* | (2006.01) | |
| *C08G 18/40* | (2006.01) | |
| *B32B 27/00* | (2006.01) | |
| *C08G 18/10* | (2006.01) | |
| *C08G 18/28* | (2006.01) | |
| *C08G 18/06* | (2006.01) | |
| *C09J 175/06* | (2006.01) | |
| *C09J 175/08* | (2006.01) | |
| *C09J 175/00* | (2006.01) | |
| *C09J 175/04* | (2006.01) | |

(52) U.S. Cl.
CPC .............. *C08G 18/12* (2013.01); *B32B 7/00* (2013.01); *B32B 7/12* (2013.01); *B32B 27/00* (2013.01); *B32B 27/06* (2013.01); *B32B 27/40* (2013.01); *C08G 18/3206* (2013.01); *C08G 18/4018* (2013.01); *C08G 18/482* (2013.01); *C08G 18/5024* (2013.01); *C08G 18/7671* (2013.01); *C09J 175/12* (2013.01); *C08G 18/06* (2013.01); *C08G 18/10* (2013.01); *C08G 18/28* (2013.01); *C08G 18/32* (2013.01); *C08G 18/3203* (2013.01); *C08G 18/3225* (2013.01); *C08G 18/3271* (2013.01); *C08G 18/3275* (2013.01); *C09J 175/00* (2013.01); *C09J 175/04* (2013.01); *C09J 175/06* (2013.01); *C09J 175/08* (2013.01); *C09J 2203/00* (2013.01)

(58) Field of Classification Search
None
See application file for complete search history.

(56) References Cited

U.S. PATENT DOCUMENTS

| | | | | | |
|---|---|---|---|---|---|
| 3,297,597 | A | * | 1/1967 | Edwards | ............ C08G 18/5033 521/166 |
| 4,190,477 | A | * | 2/1980 | Ossian | .................... B29C 43/22 156/244.11 |
| 4,209,609 | A | * | 6/1980 | Haas | .................. C08G 18/5033 528/421 |
| 4,254,272 | A | * | 3/1981 | Chung | .................... C08G 18/10 528/64 |
| 4,310,578 | A | * | 1/1982 | Katsura | .................. B32B 15/08 383/108 |
| 4,365,051 | A | * | 12/1982 | Chung | .................... C08G 18/10 528/64 |
| 4,402,172 | A | * | 9/1983 | Krueger | .................. B32B 15/08 53/425 |
| 4,465,858 | A | * | 8/1984 | Cuscurida | .......... C08G 18/5021 564/477 |
| 4,555,536 | A | * | 11/1985 | Maki | .................. C08G 18/5021 524/66 |
| 4,714,512 | A | * | 12/1987 | House | .................... C08G 18/10 156/306.6 |
| 4,743,628 | A | * | 5/1988 | Conkey | ................ C08G 18/679 521/163 |

(Continued)

FOREIGN PATENT DOCUMENTS

| | | |
|---|---|---|
| EP | 1634904 A1 | 3/2006 |
| JP | 2005089491 A | 4/2005 |

(Continued)

OTHER PUBLICATIONS

International Search Report for International PCT Patent Application No. PCT/EP2016/058922 dated Sep. 8, 2016.

*Primary Examiner* — Vivian Chen
(74) *Attorney, Agent, or Firm* — James E. Piotrowski

(57) ABSTRACT

The present invention relates to a binder system which contains an isocyanate-terminated polyurethane prepolymer as the resin component and a polyol mixture as the curing agent, said polyol mixture containing at least one alkoxylated diamine. The invention also relates to the use of the binder system as an adhesive/sealing material, in particular as a laminating adhesive for food packaging.

17 Claims, No Drawings

(56) References Cited

U.S. PATENT DOCUMENTS

| | | | | |
|---|---|---|---|---|
| 4,767,836 A * | 8/1988 | Cuscurida | C08G 18/3275 | 528/45 |
| 4,874,831 A * | 10/1989 | House | C08G 18/10 | 528/48 |
| 4,992,484 A * | 2/1991 | Taylor | C08G 18/6529 | 521/167 |
| 5,059,670 A * | 10/1991 | Harris | C08G 18/0842 | 428/209 |
| 5,145,728 A * | 9/1992 | Itaba | C08J 5/18 | 428/212 |
| 5,786,405 A * | 7/1998 | Schilling | C08G 18/5021 | 521/117 |
| 5,998,538 A * | 12/1999 | Meckel | C08G 18/10 | 524/539 |
| 6,005,016 A * | 12/1999 | Nodelman | C08G 18/6688 | 521/112 |
| 6,509,075 B1 * | 1/2003 | McCurry | G09F 3/02 | 428/346 |
| 6,809,171 B2 * | 10/2004 | Bolte | C09J 175/08 | 528/905 |
| 6,903,167 B2 * | 6/2005 | Bolte | C08G 18/10 | 156/331.4 |
| 10,179,871 B2 * | 1/2019 | Lammerschop | C08L 75/12 | |
| 2003/0050423 A1 * | 3/2003 | Huebener | C08G 18/8019 | 528/44 |
| 2003/0065125 A1 * | 4/2003 | Bolte | C08G 18/12 | 528/59 |
| 2004/0084138 A1 * | 5/2004 | Henke | C08F 283/006 | 156/272.2 |
| 2004/0138402 A1 * | 7/2004 | Thiele | C08G 18/36 | 528/74.5 |
| 2004/0162385 A1 * | 8/2004 | Krebs | C08G 18/10 | 524/589 |
| 2004/0259968 A1 * | 12/2004 | Krebs | C09J 175/04 | 528/84 |
| 2005/0282990 A1 * | 12/2005 | Schoenfeld | C08G 18/10 | 528/44 |
| 2006/0052523 A1 * | 3/2006 | Bushendorf | B32B 7/12 | 524/589 |
| 2006/0069225 A1 | 3/2006 | Wintermantel et al. | | |
| 2006/0078741 A1 * | 4/2006 | Ramalingam, Jr. | C08G 18/10 | 428/411.1 |
| 2007/0129522 A1 * | 6/2007 | Burckhardt | C09J 175/04 | 528/44 |
| 2009/0220759 A1 * | 9/2009 | Locke | B32B 25/08 | 428/217 |
| 2009/0277862 A1 * | 11/2009 | Masuda | B65D 41/0464 | 215/329 |
| 2010/0151181 A1 * | 6/2010 | Locke | C08G 18/10 | 428/76 |
| 2010/0197878 A1 * | 8/2010 | Casati | C08G 18/6696 | 526/319 |
| 2010/0209713 A1 * | 8/2010 | Qin | B32B 7/12 | 428/423.1 |
| 2010/0267925 A1 * | 10/2010 | Abraham | C07C 67/03 | 528/361 |
| 2010/0280140 A1 * | 11/2010 | Morley | C08G 18/482 | 521/114 |
| 2010/0297427 A1 * | 11/2010 | Schlingloff | C08G 18/4238 | 428/317.7 |
| 2011/0004241 A1 * | 1/2011 | Wintermantel | A61L 24/046 | 606/214 |
| 2011/0014479 A1 * | 1/2011 | Song | C08G 18/12 | 428/423.1 |
| 2011/0015292 A1 * | 1/2011 | Radhakrishnan | C08G 18/12 | 521/170 |
| 2011/0015293 A1 * | 1/2011 | Ma | C08G 18/4804 | 521/174 |
| 2011/0054060 A1 * | 3/2011 | Casati | C08G 18/4072 | 521/172 |
| 2011/0133122 A1 * | 6/2011 | Lista | C08G 18/4213 | 252/182.12 |
| 2012/0000603 A1 * | 1/2012 | Karafilidis | C08G 18/5021 | 156/331.7 |
| 2012/0021227 A1 * | 1/2012 | Kollbach | C08G 18/10 | 428/423.1 |
| 2012/0128991 A1 * | 5/2012 | Kollbach | B32B 27/32 | 428/423.7 |
| 2012/0258306 A1 * | 10/2012 | Kinzelmann | C08G 18/12 | 428/340 |
| 2012/0263836 A1 * | 10/2012 | Carlson | B32B 7/12 | 426/127 |
| 2012/0295104 A1 * | 11/2012 | Barker | C08G 18/089 | 428/344 |
| 2013/0030073 A1 * | 1/2013 | Wardius | C08G 18/4829 | 521/164 |
| 2013/0059934 A1 * | 3/2013 | Burgess | C08J 9/146 | 521/131 |
| 2013/0136931 A1 * | 5/2013 | James | B29C 67/246 | 428/423.1 |
| 2014/0322400 A1 * | 10/2014 | Carlson | C08G 18/4825 | 426/127 |
| 2015/0322314 A1 * | 11/2015 | Franken | C08G 18/12 | 524/97 |
| 2015/0344751 A1 * | 12/2015 | Allen | C08G 18/089 | 528/85 |
| 2016/0264711 A1 * | 9/2016 | Krebs | C08G 18/4837 | |
| 2016/0298009 A1 * | 10/2016 | Dey | C09J 175/08 | |
| 2016/0312091 A1 * | 10/2016 | Krishnamoorthy | C08G 18/8108 | |
| 2017/0002240 A1 * | 1/2017 | Ostlund | C08G 18/4825 | |
| 2017/0066950 A1 * | 3/2017 | Bae | C08G 18/289 | |
| 2017/0321095 A1 * | 11/2017 | Pela | C08G 18/7671 | |
| 2017/0369632 A1 * | 12/2017 | Pela | C08G 18/3206 | |
| 2019/0270838 A1 * | 9/2019 | Seehagen | B32B 27/40 | |
| 2021/0002422 A1 * | 1/2021 | Kenion | B32B 15/12 | |
| 2021/0269688 A1 * | 9/2021 | Blodau | C08G 18/755 | |

FOREIGN PATENT DOCUMENTS

| | | | |
|---|---|---|---|
| JP | 2005-161690 A | * | 6/2005 |
| JP | 2016-089028 A | * | 5/2016 |
| JP | 2016089028 A | | 5/2016 |
| WO | 2010091806 A1 | | 8/2010 |

* cited by examiner

POLYURETHANE-BASED BINDER SYSTEM

The present invention relates to a binder system which contains an isocyanate-terminated polyurethane prepolymer as the resin component and polyol mixture as the curing agent, said polyol mixture containing at least one alkoxylated diamine. The invention also relates to the use of the binder system as an adhesive/sealant, in particular as a laminating adhesive for food packaging.

Two-component binder systems, especially those based on polyols and isocyanate-terminated (NCO-terminated) compounds, have long been a part of the prior art. Examples of their use as adhesives, sealants, fillers or casting compounds are found in the metalworking industry, the automotive industry, the electrical industry, the packaging industry and the construction industry. One disadvantage of binder systems that are based on two-component polyurethane adhesives, in particular those used in the packaging industry, is the toxicity of free monomeric polyisocyanates that are contained in the binder systems. These free monomeric polyisocyanates are able to, in technical parlance, "migrate" in the coating or bond, or to an extent even into the coated or bonded materials. Given contact with moisture, the isocyanate groups of the migrates are continuously reacted to form amino groups, and, in the process, so-called primary aromatic amines (PAA) are formed from aromatic polyisocyanates. The migration of these migrates through the packaging material can lead to the contamination of the packaged product. Since the toxicity of PAAs is particularly worrisome, thus making it especially undesirable in the packaging industry and for food packaging in particular the legislature has issued limits for migrates coming from food packaging, and it is imperative that these be observed. It is thus essential that the adhesives used for the production of composite films will have cured sufficiently by the time the food is packaged so that the limits are not exceeded. Therefore, after the packaging has been produced (whereby composite films are of particular importance), the composite films must be stored before packing the food until the reaction has progressed far enough that the migration of PAAs is no longer detectable or falls below the prescribed limits.

Depending on the amount of the migrate-capable free monomeric polyisocyanate, long waiting periods are thus needed before the packaging material meets food safety standards and may be used. For both economic and logistical reasons, it is therefore desirable to reduce to a minimum the storage time needed before the packaging material may be further used.

A further undesirable effect which may arise due to the migration of monomeric polyisocyanates is known as the anti-seal effect, which arises in the production of sacks or shopping bags made of laminated plastics film. Laminated plastics film frequently contains a lubricant based on fatty acid amides. The reaction of migrated monomeric polyisocyanate with the fatty acid amide and moisture creates, at the film surface, urea compounds having a melting point that may be above the sealing temperature of the plastic film. This leads to the formation, between the film parts to be sealed together, of a dissimilar, anti-seal layer which hinders the formation of a uniform sealing seam.

There are a variety of well-known approaches for preventing the migration of monomeric aromatic polyisocyanates. Among others, these include reducing the amount of aromatic polyisocyanates used in the synthesis of the isocyanate-terminated polyurethane prepolymer; micro-distillation of the isocyanate monomer; the use of prepolymer mixtures having multi-stage curing mechanisms; and the use of special polyether backbones in NCO-terminated prepolymers, for example as described in WO 2010/091806.

Disadvantages of the known approaches include the reduced reactivity of the system (reduction of the amount of aromatic polyisocyanates), thus possibly requiring the use of catalysts, which may likewise pose the risk of toxicity; the necessity of certain costly processes and facilities (microdistillation); or the difficulty in planning necessary modifications to the prepolymer synthesis process (use of special polyether backbones). Furthermore, the prepolymers described in WO 2010/091806 have the disadvantage of being autocatalytic, thus requiring at least four weeks of storage in order to gel.

In addition, many of the known systems have the disadvantage that the usual metal catalysts, for example tin-based catalysts or amine catalysts using, for example, 1,4-Diazabicyclo[2.2.2]octane (DABCO), have short pot lives, which is a drawback for application using lamination machines, particularly in larger quantities. Also, in systems of this kind relatively large quantities of catalyst do not cause a significant reduction in migration times.

Therefore, the problem addressed by the present invention is to provide a binder system which overcomes these disadvantages and which, in spite of using conventional isocyanate-terminated polyurethane (PU) prepolymers having high concentrations of isocyanate monomers, exhibits rapid chemical curing and thus a rapid reduction in migrate content so that the packaging material is able to be used as soon as possible after being manufactured, thus allowing the waiting period to be minimized. Furthermore, the pot life for the binder system should be long enough to allow for processing by means of commonly used laminating machines.

The inventors made the surprising discovery that this problem can be solved by the use of a special polyol mixture for curing the isocyanate-terminated polyurethane prepolymers, said polyol mixture containing at least one alkoxylated diamine.

A first aspect of the present invention thus relates to a binder system comprising (i) a resin component which contains at least one isocyanate-terminated polyurethane prepolymer; and (ii) a curing agent which contains at least one alkoxylated diamine.

A further aspect of the invention relates to a method for producing an adhesive/sealant that uses the binder system described herein. The resin component is thus mixed with the curing component in a (molar) ratio of isocyanate groups to NCO-reactive groups of 1:1 to 4:1, preferably 1:1 to 3:1, more preferably 1.2:1 to 2.5:1, and particularly preferably 1.2:1 to 1.8:1, whereby the NCO-reactive groups are preferably hydroxyl groups.

Yet another aspect of the invention relates to methods for producing composite films, whereby at least two plastic films that are the same or different are bonded together over all or part of the surface using a binder system described herein, as well as the composite film produced in this way.

Yet another aspect of the invention is directed to the use of the binder system described herein in adhesive formulations, in particular use as a two-component adhesive and preferably as a solventless or a solvent-containing laminating adhesive, for producing low-migrate adhesive bonds between substrates, whereby the substrates are selected in particular from among paper, cardboard, wood, plastic, metal or stoneware.

Finally, the invention also relates to the use of a composition containing at least one alkoxylated diamine in a quantity of 0.5 to 20 wt %, in particular 1 to 10 wt %, and containing at least one polyol in a quantity (based on the polyol mixture) of 80 to 99.5 wt %, preferably 90 to 99 wt %, as a curing component in adhesive formulations which are based on polyurethane prepolymers and are aromatic isocyanate-terminated, said composition being used for producing low-migrate adhesive bonds between substrates, whereby the substrates are preferably substrates in film form, quite preferably plastic films.

Unless indicated otherwise, the molecular weights mentioned in the present document refer to the number average molecular weight ($M_N$). Unless indicated otherwise, all molecular weights mentioned refer to values obtainable by gel permeation chromatography (GPC) in accordance with DIN 55672, in particular DIN 55672-1, using THF as the eluent.

Unless indicated otherwise, hydroxyl numbers (OH numbers) are determined in accordance with DIN 53240.

The OH functionality of a compound is to be understood as meaning its average OH functionality. It indicates the average number of hydroxyl groups per molecule. The average OH functionality of a compound can be calculated on the basis of the number average molecular weight and the hydroxyl number.

Unless indicated otherwise, the isocyanate content (NCO content, % NCO) is determined in accordance with DIN EN ISO 11909.

The NCO functionality of a compound is to be understood as meaning its average NCO functionality. It indicates the average number of NCO groups per molecule. The average NCO functionality can be calculated on the basis of the number average molecular weight and the NCO number for the compound.

The molar ratio of NCO to OH groups (NCO index) can be calculated using the OH number and the NCO content.

As used herein, "at least one" refers to 1 or more, for example 1, 2, 3, 4, 5, 6, 7, 8, 9 or more. With respect to an ingredient, the value relates to the kind of ingredient and not to the absolute number of molecules. For example, "at least one polyol" thus means at least one kind of polyol, hence that one kind of polyol or a mixture of several different polyols may be used. In the context of weight, the indicated value relates to all compounds of the stated kind that are contained in the composition/mixture, which means that the composition/mixture does not contain any further compounds of this kind in addition to the stated amount of the corresponding compounds.

Unless explicitly stated otherwise, all percentages indicated in connection with the compositions described herein relate to % by weight (wt %), based in each case on the mixture in question.

As used herein in connection with a numerical value, the terms "approximately" or "about" refer to the numerical value of ±10%, preferably ±5%.

The surprising finding was made that the binder systems described herein are quite suitable as adhesives/sealants, whereby they exhibit a long pot life yet also exhibit complete chemical curing, thus leading to a rapid reduction in migrate content. The binder systems are preferably "low-migrate". In the following text, the expression "low-migrate" is to be understood as meaning that the content of primary aromatic amines (PAA) will after 1 to 14 days, preferably 2 to 6 days, measure<0.2 µg PAA/100 mL filler ("filler" is defined as the content of packaging that consists of films glued using the adhesive system described). The primary aromatic amine content is measured for this purpose in accordance with § 64 LFGB [German Food and Feed Code], as specified in Method L00.00-6. To test for the migration of PAAs in accordance with § 64 LFGB, a pouch made of the film composite is filled with a food simulant (aqueous solution containing 3 wt % acetic acid), which is stored for 2 hrs. at 70° C. The PAA content is then tested photometrically following derivatization. This must achieve contents of less than 0.2 µg PAAs per 100 mL of food simulant. This corresponds to 2 ppb, which also happens to be the detection limit of the method described.

The NCO-terminated PU prepolymers of the resin component are obtained by reacting a polyol or a polyol mixture with a stoichiometric excess of polyisocyanate. The polyols used in the preparation of the prepolymer may be any polyols commonly used for polyurethane synthesis, for example monomeric polyols, polyester polyols, polyether polyols, polyester ether polyols, polycarbonate polyols, or mixtures of two or more of the foregoing.

Polyether polyols can be produced from a large number of alcohols which contain one or more primary or secondary alcohol groups. As initiators for the production of the tertiary amino group-free polyethers, the following compounds, for example, or mixtures of these compounds, may be used: water, ethylene glycol, 1,2-propylene glycol, glycerol, butanediol, butanetriol, trimethylolethane, pentaerythritol, hexanediol, hexanetriol, 3-hydroxyphenol, trimethylolpropane, octanediol, neopentyl glycol, 1,4-hydroxymethylcyclohexane, bis(4-hydroxyphenyl)dimethylmethane, and sorbitol. Preferably used are ethylene glycol, 1,2-propylene glycol, glycerol, and trimethylolpropane, particularly preferably ethylene glycol and 1,2-propylene glycol, and, in a particularly preferable exemplary embodiment, 1,2-propylene glycol is used.

Considered to be suitable as cyclic ethers for the production of the polyethers described above are alkylene oxides, such as ethylene oxide, propylene oxide, butylene oxide, epichlorohydrin, styrene oxide, or tetrahydrofuran, or mixtures of these alkylene oxides. The use of propylene oxide, ethylene oxide or tetrahydrofuran or mixtures of these is preferred. Propylene oxide or ethylene oxide or mixtures of these are particularly preferably used. Propylene oxide is most particularly preferably used.

Polyester polyols may be produced, for example, by reacting low molecular weight alcohols, in particular ethylene glycol, diethylene glycol, neopentyl glycol, 1,6-hexanediol, 1,4-butanediol, 1,2-propylene glycol, glycerol, or trimethylolpropane with caprolactone. Also suitable as polyfunctional alcohols for producing polyester polyols are 1,4-hydroxymethylcyclohexane, 2-methyl-1,3-propanediol, 1,2,4-butanetriol, triethylene glycol, tetraethylene glycol, polyethylene glycol, dipropylene glycol, polypropylene glycol, dibutylene glycol, and polybutylene glycol.

Other suitable polyester polyols can be produced by polycondensation. Difunctional and/or trifunctional alcohols can thus be condensed with an insufficient quantity of dicarboxylic acids or tricarboxylic acids, mixtures of dicarboxylic acids or tricarboxylic acids, or reactive derivatives thereof, to form polyester polyols. Suitable dicarboxylic acids are, for example, adipic acid or succinic acid and higher homologues thereof with up to 16 C atoms, as well as unsaturated dicarboxylic acids, such as maleic acid or fumaric acid, as well as aromatic dicarboxylic acids, in particular the isomeric phthalic acids, such as phthalic acid, isophthalic acid or terephthalic acid. Examples of suitable tricarboxylic acids include citric acid or trimellitic acid. The aforementioned acids can be used individually or as mixtures of two or more thereof. Particularly suitable alcohols are 1,6-hexanediol, 1,4-butanediol, ethylene glycol, diethylene glycol, neopentyl glycol, 3-hydroxy-2,2-dimethylpropyl 3-hydroxy-2,2-dimethylpropanoate, or trimethylolpropane, or mixtures of two or more thereof. Particularly suitable acids are phthalic acid, isophthalic acid, terephthalic acid, adipic acid, or dodecanedioic acid or mixtures thereof. Polyester polyols with high molecular weight include, for example, the reaction products of polyfunctional, preferably difunctional, alcohols (optionally together with small quantities of trifunctional alcohols) and polyfunctional, preferably difunctional, carboxylic acids. Instead of free polycarboxylic acids, (if possible) the corresponding polycarboxylic anhydrides or corresponding polycarboxylic acid esters with alcohols having preferably 1 to 3 C atoms can also be used. The polycarboxylic acids may be aliphatic, cycloaliphatic, aromatic, or heterocyclic. They may optionally be substituted, for example by alkyl groups, alkenyl groups, or ether groups. Examples of suitable polycarboxylic acids include succinic acid, adipic acid, suberic acid, azelaic acid, sebacic acid, dodecanedioic acid, phthalic acid, isophthalic acid, terephthalic acid, trimellitic acid, phthalic anhydride, tetrahydrophthalic anhydride, hexahydrophthalic anhydride, endomethylene tetrahydrophthalic anhydride, glutaric anhydride, maleic acid, maleic acid anhydride, fumaric acid, dimer fatty acid, or trimer fatty acid, or mixtures of two or more thereof.

Polyesters obtainable from lactones, for example based on ε-caprolactone, also known as "polycaprolactones," or from hydroxycarboxylic acids, for example ω-hydroxycaproic acid, can also be used.

It is, however, also possible to use polyester polyols of oleochemical origin. Such polyester polyols may, for example, be produced by complete ring opening of epoxidized triglycerides of a fat mixture containing at least in part an olefinically unsaturated fatty acid with one or more alcohols having 1 to 12 C atoms and subsequent partial transesterification of the triglyceride derivatives to yield alkyl ester polyols having 1 to 12 C atoms in the alkyl residue.

Polycarbonate polyols may, for example, be obtained by reacting diols, such as 1,2-propylene glycol, 1,4-butanediol or 1,6-hexanediol, diethylene glycol, triethylene glycol or tetraethylene glycol or mixtures of these diols with diaryl carbonates, for example diphenyl carbonates, or phosgene.

The molecular weight of the polyols used to synthesize the prepolymer is preferably in the range of 320 to 20000 g/mol, in particular 330 to 4500 g/mol. The average functionality may be in the range of 2 to 4.5.

In various embodiments of the invention, polyols are used for producing the NCO-terminated prepolymer polyester polyols, in particular those obtainable by condensing adipic acid and/or isophthalic acid with diethylene glycol and/or 1,2-propylene glycol. As an option in addition to polyester polyols, polyether polyols, in particular polypropylene glycol, may also be used for producing the NCO-terminated prepolymers. These PU prepolymers are obtainable by reacting polyisocyanates with a mixture of polyethers and polyesters. In a particularly preferable embodiment, the NCO-terminated prepolymers feature a polyether/polyester polymer backbone.

Suitable polyisocyanates are aliphatic, aromatic and/or alicyclic isocyanates having two or more, preferably from two to at most about four, groups of isocyanates. Particularly preferable for use within the scope of the invention are monomeric polyisocyanates, in particular monomeric diisocyanates. Examples of suitable monomeric polyisocyanates are: 1, 5-naphthylene diisocyanate, 2,2-, 2,4'- and 4,4'-diphenylmethane diisocyanate (MDI), hydrogenated MDI (H12MDI), xylylene diisocyanate (XDI), tetramethylxylylene diisocyanate (TMXDI), di- and Tetraalkyldiphenylmethan-diisocyanate, 4,4'-dibenzyl cyanate, 1,3-phenylene diisocyanate, 1, 4-phenylene diisocyanate, 2,4- and/or 2,6-toluene diisocyanate (TDI), 1-methyl-2,4-diisocyanato-cyclohexane, 1, 2,2,4-trimethylhexane-1,6-diisocyanate, 2,4,4-trimethylhexane-1,6-diisocyanate, 2,3,3-trimethylhexane-1, 6-diisocyanate, 1-isocyanatomethyl-3-isocyanato-1,5,5-thmethyl-cyclohexane (IPDI), phosphorous diisocyanate, tetramethoxybutane-1,4-diisocyanate, ethylene-1,2-diisocyanate, butane-1,4-diisocyanate, pentane-1,5-diisocyanate, hexane-1,6-diisocyanate (HDI), undecane-1,11-diisocyanate, dodecane-1,12-diisocyanate, dicyclohexylmethane diisocyanate, cyclohexane-1,4-diisocyanate, phthalic acid-bis-isocyanato-ethylester, dimer fatty acid diisocyanate, 1,3-cyclohexane diisocyanate, 1,4-cyclohexane diisocyanate, 1,3- or 1,4-tetramethyl xylol diisocyanate and lysine ester diisocyanate.

Suitable examples of at least trifunctional isocyanates are polyisocyanates obtained by trimerization or oligomerization of diisocyanates, for example the isocuranate trimers, or by reaction of diisocyanates with polyfunctional compounds containing hydroxyl or amino groups. Suitable examples of polyfunctional compounds containing hydroxyl groups used for producing the at least trifunctional cyanates are glycerol, trimethylol ethane, pentaerythritol in addition, as well as sugar alcohols such as sorbitol, mannitol, isomalt, maltitol and xylitol.

Examples of isocyanates suitable for the production of trimers are the diisocyanates mentioned above, the trimerization products of HDI, MDI, TDI or IPDI being particularly preferable.

In addition, adducts of diisocyanates and low molecular weight triols, more particularly the adducts of aromatic diisocyanates and triols, for example trimethyol propane or glycerol, are also suitable as triisocyanates Also suitable are the polymeric isocyanates, for example those obtained as a residue in the liquid phase of the distillation of diisocyanates.

The polyisocyanates preferable for use are aromatic polyisocyantes, with aromatic diisocyanates being particularly preferable. Therefore, in a preferential embodiment of the invention, used as polyisocyanates are monomeric polyisocyanates from the group consisting of 1,5-naphthylene diisocyanate, 2,2-, 2,4- and/or 4,4-diphenylmethane diisocyanate (MDI), 2,4- and/or 2,6-toluene diisocyanate (TDI), tetramethylxylylene diisocyanate (TMXDI), trimerization products of the isocyanates MDI or TDI, as well as mixtures thereof. Particularly preferable are the isomeres of diphenylmethane diisocyanate, namely 4,4'-MDI, 2,4'-MDI and 2,2'-MDI, or mixtures thereof. In particular, 4,4'-MDI is preferable here because migrate content reduction takes place especially quickly when this isomer is used.

Therefore, the at least one NCO-terminated PU prepolymer is preferably an aromatic isocyanate-terminated PU prepolymer made of one or more polyester polyol(s) and an aromatic diisocyanate.

In a particularly preferable embodiment of the invention, the at least one NCO-terminated PU prepolymer is an MDI-terminated polyurethane prepolymer able to be produced from one or more polyester polyol(s) and MDI.

Preferable according to the invention are NCO-terminated prepolymers having a polyester/polyether polymer backbone, in particular one made of a polyester polyol, polypropylene glycol and MDI, whereby the polyester polyol is obtainable by condensing adipic acid and isophthalic acid with an excess of diethylene glycol and 1,2-propylene glycol.

In a preferential embodiment of the invention, the isocyanate-terminated polyurethane prepolymer does not feature a polyether polymer backbone comprising an amine-initiated polyether.

The stoichiometric excess of polyisocyanate used in synthesizing the prepolymers preferably measures (in terms of the molar ratio of NCO groups to OH groups) from 1:1 to 5:1, more preferably 2:1 to 4:1, and particularly preferably 2.5:1 to 3.5:1.

The NCO content of the corresponding prepolymers is typically from 3 to 20 wt %, preferably 5 to 17 wt %, and they have an average NCO functionality of from 2 to 3.

Due to the excess isocyanate used, the NCO-terminated PU prepolymers typically contain certain amounts of isocyanate monomers, these in particular being aromatic polyisocyanate monomers such as MDI. The amount thereof typically measures from 0.1 to 40 wt % and, for example, from 20 to 30 wt % based on the total weight of the resin component. In order to minimize the amount of migrates that are hazardous to health, a content of less than 1 wt % is aimed for, but resin components of this kind exhibit relatively high viscosity. However, since alkoxylated diamine reduces the migrate content, the use of a curing component containing at least one alkoxylated diamine makes it possible to use conventional curing components, meaning those having an NCO content of 20 to 30 wt % based on the total weight of the curing component.

Typically, the molecular weight ($M_N$) of the prepolymers is within the range of 500 g/mol to 100000 g/mol, preferably 600 g/mol to 25000 g/mol, particularly preferably 700 g/mol to 6000 g/mol.

The production of NCO-terminated prepolymers per se is known to those skilled in the art, and is accomplished, for example, by mixing liquid polyols at reaction temperatures with an excess of the polyisocyanate and stirring the resulting mixture until a constant NCO value is obtained. The selected reaction temperature is preferably within the range of 40° C. to 180° C., preferably 50° C. to 140° C.

In addition to the resin component, the binder system according to the invention also contains a curing component. The curing component contains at least one alkoxylated diamine, preferably in a quantity of 0.5 to 20 wt %, even more preferably 1 to 10 wt %. In addition to the alkoxylated diamine, the curing component preferably also contains a polyol different from the alkoxylated diamine and in a quantity of 80 to 99.5 wt %, in particular 90 to 99 wt %. This at least one polyol can mean one or more polyols to be selected from among those disclosed above in connection with the production of prepolymers. These additional polyols are preferably di- and/or tri-functional polyether polyols, for example as described herein above.

Examples of suitable alkoxylated diamines include, without being restricted thereto, polyether polyols that, using diamine as a starter, are obtainable by polymerizing ethylene oxide and/or propylene oxide, in particular ethoxylated and/or propoxylated alkylene diamines. Examples of suitable diamines are, without being restricted thereto, ethylene diamine, N,N-dimethylethylene diamine, N,N'-dimethylethylene diamine, propylene diamine, tetramethylene diamine, hexamethylene diamine, 2,4-toluene diamine, 2,6-toluene diamin, diphenylmethane-2,2'-diamine, diphenylmethane-2, 4'-diamine, diphenylmethane-4,4'-diamine, isophorone diamine, dicyclohexylmethane-4,4'-diamine and xylylene diamine. Preferable diamines are ethylene diamine, N,N-dimethylethylene diamine and N,N'-dimethylethylene diamine, particularly preferably ethylene diamine.

Used in various embodiments of the invention are alkoxylated diamine compounds of Formula 1:

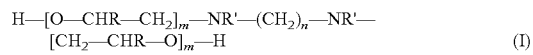

$$H-[O-CHR-CH_2]_m-NR'-(CH_2)_n-NR'-[CH_2-CHR-O]_m-H \quad (I)$$

wherein
each R is independently selected from H, $CH_3$ and $CH_2$-$CH_3$, preferably H and $CH_3$, and particularly preferably $CH_3$;
each R' is independently selected from H and —[$CH_2$—CHR—O]$_m$—H, preferably —[$CH_2$—CHR—O]$_m$—H;
each m, independently, is a whole number from 1 to 10, preferably from 1 to 4, and even more preferably from 1 to 2;
n is a whole number from 1 to 10, preferably from 1 to 6, particularly preferably from 2 to 4, and is most preferably 2.

In preferential embodiments, the alkoxylated diamine is a propoxylated or ethoxylated/propoxylated ethylene diamine having 2 to 8 units of propylene oxide/ethylene oxide for every unit of ethylene diamine.

Diamines of this kind are available, for example, under the trade names Voranol® RA 500, RA 640 and RA 800 (Dow Chemicals).

Also suitable are mixtures of 2 or more of the alkoxylated diamines described above herein.

Furthermore, various embodiments of the binder system described herein can contain at least one catalyst, preferably amine catalysts or metal catalysts based on Sn, Zn, Bi, Zr, V or Ti. Suitable catalysts are known from the prior art. However, preferential embodiments of the binder system do not contain such a catalyst.

The binder system described herein is particularly suitable for use as an adhesive/sealant.

Therefore, the object of the present invention is a method for producing an adhesive/sealant using the binder system described herein, whereby the resin component is mixed with the curing component in a ratio of isocyanate groups to NCO-reactive groups of 1:1 to 4:1, preferably 1:1 to 3:1, more preferably 1.2:1 to 2.5:1, and particularly preferably 1.2:1 to 1.8:1, whereby the NCO-reactive groups are preferably hydroxyl groups.

60 minutes following mixture of the two components, various embodiments of the adhesive/sealant thus obtained have a viscosity at 40° C. of 2000 to 30000 mPas, preferably 4000 to 12000 mPas (in accordance with DIN EN ISO 2555, Brookfield RVT DV 11+, spindle no. 27, shear rate: 20 min$^{-1}$).

In an embodiment of the method described herein, the reaction between the resin component and the curing component takes place in the presence of a solvent. In principle, all of the solvents known to one skilled in the art can be used, in particular esters, ketones, halogenated hydrocarbons, alkanes, alkenes, and aromatic hydrocarbons. Examples of such solvents are methylene chloride, trichloroethylene, toluene, xylene, butyl acetate, amyl acetate, isobutyl acetate, methyl isobutyl ketone, methoxybutyl acetate, cyclohexane, cyclohexanone, dichlorobenzene, diethyl ketone, di-isobutyl ketone, dioxane, ethyl acetate, ethylene glycol monobutyl ether acetate, ethylene glycol monoethyl acetate, 2-ethylhexyl acetate, glycol diacetate, heptane, hexane, isobutyl acetate, isooctane, isopropyl acetate, methyl ethyl ketone, tetrahydrofuran or tetrachloroethylene, or mixtures of two or more of the solvents named. In preferential embodiments, however, no solvent is used.

The binder system described herein is suitable as a two-component adhesive used for gluing and sealing a wide variety of substrates. These substrates include, for example, wood, metal, glass, plant fibers, stone, paper, cellophane, plastics such as polystyrene, polyethylene, polypropylene, polyethylene terephthalate, polyvinyl chloride, copolymers of vinyl chloride and vinylidene chloride, copolymers of vinyl acetate olefins, polyamide. Preferred substrates are substrates in film form, including but not restricted to plastic films and metal films. Plastic films for use as a substrate include films made from polypropylene (PP), polyethylene (PE), oriented polypropylene (OPP), oriented polyamide (OPA), nylon, polyethylene terephthalate (PET) and polyesters. Metal films can consist of, for example, aluminum, lead, or copper.

In a particularly preferable embodiment of the invention, the binder system described herein is used as a solventless or a solvent-containing laminating adhesive, in particular as a lamination adhesive for food packaging.

The binder system described herein can be applied to the substrates to be bonded by using all conventional application methods, for example, by spraying, doctor blade application, three-four-roller application systems in the case of use of a solvent-free binder system or two-roller application systems in the case of use of a solvent-based binder system.

An additional object of the invention is also a method for producing composite films, wherein at least two plastic films that are the same or different are bonded together over all or part of the surface using the binder system described herein. The binder system may be applied as a two-component adhesive to the films to be bonded using the machines conventionally used for such purposes, for example traditional lamination machines. An additional object of the invention is a composite film that is produced according to the method described herein and using the binder system described herein. The composite film is suitable in particular for packaging foods and luxury items as well as medicinal products.

The binder system described herein may contain the usual additives such as plasticizers, silanes, antioxidants, UV stabilizers and antiaging agents. Plasticizers preferred for use here include phthalic acid esters, for example dioctyl phthalate, ditridecyl phthalate and butylbenzyl phthalate, phosphoric acid esters such as tricresyl phosphate, adipates, for example dioctyl adipate, or benzoates, for example propylene glycol dibenzoate.

Aminosilanes, epoxysilanes or mercaptosilanes, in particular γ-glycidyloxypropyl trimethoxysilane or γ-aminopropyl trimethoxysilane, are used in particular to improve adhesion to glass, metals, etc.

For use as a sealing compound, inorganic fillers such as carbon black, calcium carbonate, titanium dioxide and the like may be added to the binder systems described herein. Highly dispersed silicic acids, in particular pyrogenic silicic acids or precipitated silicic acids are preferably used as inorganic fillers which have a thixotropic effect and whose thixotropic properties are also maintained in the binder systems described herein, even after prolonged storage.

The binder systems described herein can be used in adhesive bond formulations used for producing low-migrate adhesive bonds between substrates. The substrates can thus be selected from those mentioned above and comprise in particular plastic films and metal films, for example those used in food packaging.

Described earlier in connection with the binder system is a curing component containing at least one alkoxylated diamine in a quantity of 0.5 to 20 wt %, in particular 1 to 10 wt %, and containing at least one polyol in a quantity (based on the polyol mixture) of 80 to 99.5 wt %, preferably 90 to 99 wt %, and this curing composition can, in order to produce low-migrate adhesive bonds between substrates, be used as a curing component in adhesive formulations which are based on polyurethane prepolymers and are aromatic isocyanate-terminated. The substrates can thus be defined as above.

All the embodiments disclosed herein in conjunction with the binder system can also be used with the applications and methods described herein and vice versa.

The invention will be described hereinafter on the basis of several exemplary embodiments. Unless otherwise indicated, amounts will be indicated as % by weight (wt %).

EXAMPLES

Test Series 1:
Example 1a (not according to the invention):
Resin component: Loctite Liofol LA 7731 (MDI-terminated polyether/polyester PU prepolymer, available from Henkel)
Curing component: Loctite Liofol LA 6038 (polyol mixture made from dipropylene glycol (DPG) and trifunctional polyether polyols having predominantly secondary hydroxyl end groups; available from Henkel).

Example 1b (according to the invention): as in Example 1a, except that the 5 wt % DPG in the curing component is exchanged for Voranol R800 (OH number of 780-820 mg KOH/g; oxypropylene adduct of ethylene diamine, available from The Dow Chemical company)

Example 1c (according to the invention): as in Example 1a, except that the 5 wt % DPG in the curing component is exchanged for Voranol R640 (OH number of 615-665 mg KOH/g; oxypropylene adduct of ethylene diamine, available from The Dow Chemical company)

Example 1b (according to the invention): as in Example 1a, except that the 5 wt % DPG in the curing component is exchanged for Voranol RA500 (OH number of approx. 500 mg KOH/g; oxypropylene adduct of ethylene diamine, available from The Dow Chemical company)

Example 1e (not according to the invention): as in Example 1a, except that the 0.05 wt % polyether polyol in the curing component is exchanged for dioctyltin dilaurate (DOTL)

Example 1f (not according to the invention): as in Example 1a, except that the 0.1 wt % polyether polyol in the curing component is exchanged for 1,4-Diazabicyclo[2.2.2]octane (DABCO)

Example 1g (not according to the invention): as in Example a, except that the 1 wt % polyether polyol in the curing component is exchanged for triethanolamine Test Series 2:
Example 2a (not according to the invention): as in Example 1a Example 2b (according to the invention): as in Example 1d Example 2c (not according to the invention): as in Example 1b Example 2d (not according to the invention): as in Example 1a, except that the 5 wt % DPG in the curing component is exchanged for Desmophen V 155 (oxypropylene adduct of triethanolamine, available from Bayer MaterialScience)

Example 2e (not according to the invention): as in Example 1a, except that the 5 wt % DPG in the curing component is exchanged for TIPA (triisopropanolamine)

Example 2f (not according to the invention): as in Example 1a, except that, instead of the resin component, a prepolymer made from a tertiary amine-initiated polyether-polyol (Voranol Voractiv VM 779, available from The Dow Chemical company), polypropylene glycol (PPG2000), and 2,4'-/4,4'-MDI (Desmodur 2460, available from Bayer MaterialScience) are used.

An OPA/PE structure laminated with 1.8 g/m² adhesive was used in order to measure PAA in the filler simulant (3% acetic acid) using the BfR method. The results are shown in Table 1 and indicated as the amount of PAA in pg/100 mL of filler simulant. The target value is <2 μg PAA/100 mL filler simulant. Variations in the testing procedure, for example in the quality of the films and/or the weights of adhesive applied, may have had an influence on the PAA values measured. For this reason, absolute PAA values should be compared only within a test series, hence in the present case only within test series 1 and within test series 2.

Moreover, the interlayer adhesion (VH) is determined in accordance with the DIN ISO 53357 standard. Using a strip cutter, 15 mm-wide strips of the composite were cut in order to determine the interlayer adhesion. The composite was then separated by hand or on a hot sealing jaw edge. In the case the composites have cured, it may be helpful to insert one end of the composite strip into ethyl acetate. The measurement was performed using a universal tensile testing machine, force range 0-20 N (from Instron or Zwick, for example). The composite strips that were previously separated were clamped in, and the tensile testing machine was started up at a draw-off rate of 100 mm/min; the draw-off angle was 90° (to be maintained manually) and the draw-off length was 5-10 cm (depending on the range of fluctuation). The result is provided as an interlayer adhesion in N/15 mm, and the indicated value is the average of three measurements. In case of a tear in the film, the maximum value is indicated.

Sealed seam strength (SNH) is determined in accordance with the DIN ISO 55529 standard. For this purpose, the OPA/PE structure was first sealed against itself (PE on PE) at 150° C. for 1 sec. while applying a force of 650 N against a surface 1 cm×15 cm. The sealed seam strength was then determined using a universal tensile testing machine, force range 0-20 N (from Instron or Zwick, for example). Using a strip cutter, 15 mm-wide strips of the composite were then cut, the composite strips were clamped in, and the tensile testing machine was started up at a draw-off rate of 100 mm/min; the draw-off angle was 90° (to be maintained manually) and the draw-off length was 5-10 cm (depending on the range of fluctuation). The result is provided as a sealed seam strength in N/15 mm, and the indicated value is the average of three measurements.

The viscosity (in mPas) was determined 60 minutes after mixing and at 40° C.

The NCO content of the resin (in wt %) and the OH number of the curing agent (in mg KOH/g) were also determined.

The mixture ratio is indicated in parts by mass (g/g).

Table 1 shows an overview of the measured values.

TABLE 1

| Example | PAA (BfR) [μg/100 mL] | | | SNH (N/15 mm) | VH (N/15 mm) | | Viscosity (mPas) | NCO content of resin (%) | OH number of curing agent (mg KOH/g) | Ratio of resin to curing agent (g/g) |
|---|---|---|---|---|---|---|---|---|---|---|
| | 2 d | 4 d | 7 d | 7 d | 7 d | 14 d | | | | |
| 1a | 24.82 | 3.82 | 0.99 | 60* | 5.8*7 | 6.2* | 4425 | 13 | 246 | 100:48 |
| 1b | 17.97 | 2.75 | 0.50 | 62* | .0* | 7.0* | 3750 | 13 | 244 | 100:50 |
| 1c | 8.31 | 0.66 | 0.18 | 55* | 6.7* | 7.0* | 10900 | 13 | 236 | 100:55 |
| 1d | 5.76 | 0.66 | 0.19 | 54* | 6.9* | 6.8* | 9500 | 13 | 229 | 100:55 |
| 1e | 17.90 | 0.92 | 0.48 | 50* | 5.9* | 6.8* | *** | 13 | 246 | 100:48 |
| 1f | 25.05 | — | 0.89 | 57* | 5.9* | 6.1* | 15050 | 13 | 252 | 100:48 |
| 1g | 25.60 | — | 0.85 | 52* | 5.0* | 5.3* | 10825 | 13 | 255 | 100:50 |
| 2a | 8.11 | 0.27 | 0.07 | 63* | 7.4* | 6.8* | 4425 | 13 | 246 | 100:48 |
| 2b | 0.86 | 0.10 | | 51* | 7.6* | 6.2* | 9500 | 13 | 229 | 100:55 |
| 2c | 1.84 | 0.14 | 0.06 | 65* | 7.2* | 6.9* | 3750 | 13 | 244 | 100:50 |
| 2d | 0.53 | 0.07 | | 38** | 1.7** | 1.2** | 3900 | 13 | 212 | 100:50 |
| 2e | 6.45 | 0.27 | 0.10 | 74* | 7.9* | 6.1* | 8425 | 13 | 248 | 100:50 |
| 2f | 0.20 | 0.17 | | 33** | 3.2** | 3.1** | 6250 | 12 | 246 | 100:48 |

*Tearing or breaking of the material
**Separation at the boundary surface of the adhesive (adhesive separation)
***25000 mPas after 12 min. Measurement discontinued after 20 min. and 100000 mPas.

The results indicate that the PAA values in the case of the binder system according to the invention subside more quickly than in the corresponding reference system, which contained no alkoxylated diamine in the curing agent (Examples 1b, 1c, and 1d vs. Example 1a. Examples 2b and 2c vs. Example 2a).

The use of triethanolamine in the curing agent causes no reduction in the PAA values in comparison to the reference (Example 1g vs. Example 1a).

The use of triisopropanolamine in the curing agent causes the PAA values to subside more quickly in comparison to the reference (Example 2e vs. Example 2a), but the effect is far less pronounced than when using alkoxylated diamines (Example 2e vs. Examples 2b and 2c).

It was furthermore shown that the use of tin-based catalysts causes a somewhat faster reduction in PAA values, but also causes an increase in viscosity, which corresponds to a shorter pot life (see Example 1e vs. Example 1a). Furthermore, the use of tin compounds in food packaging poses a health concern.

As was the case for the tin-based catalysts, the use of amine catalysts likewise caused a higher viscosity and a shorter pot life. Furthermore, no acceleration in the reduction of PAA values was observed (see Example 1f vs. Example 1a).

Like the formulations according to the invention, binder systems using polyether polyols producible by alkoxylating monoamines exhibit rapidly subsiding PAA values as well as low viscosities, but the bond strength values are lower (Example 2d vs. 2b and 2c).

Similar results were seen in binder systems in which the resin comprised an isocyanate-terminated prepolymer produced from a tertiary amine-initiated polyether polyol. Rapidly subsiding PAA values and low viscosities comparable to those in the formulations according to the invention were determined in this case as well, but the bond strength values were poorer (Example 2f vs. Examples 2b and 2c). Furthermore, a resin featuring such prepolymers exhibits diminished storage stability because the tertiary amino groups in the polymer backbone of the isocyanate-terminated polyurethane prepolymer catalyze the isocyanate groups. Autocatalytic activity having a negative effect on stability is thus detected in the prepolymers. This is based on the observation that, following not more than four weeks of storage in a closed container, these prepolymers were solid.

The invention claimed is:

1. A two component, low migrate laminating adhesive for food packaging composite film, comprising:
   (i) a resin component comprising at least one isocyanate-terminated polyurethane prepolymer that is the reaction product of a mixture comprising a monomeric polyisocyanate and a resin component polyol, wherein the resin component has an aromatic polyisocyanate monomer content of 10 wt. % to 40 wt. % based on the total weight of the resin component and the resin component polyol is not a polyester polyol containing isophthalic acid moieties and is not a tertiary amino group containing polyether polyol; and
   (ii) a curing component comprising 0.5 wt. % to 20 wt. % at least one alkoxylated diamine based on the weight of the curing component and at least one curing component polyol, wherein the curing component polyol is not a polycondensation product of an aromatic phthalic acid, is not a polyester polyol containing isophthalic acid moieties, and is not polyester polyol of oleochemical origin;
   wherein the binder system is free of filler and free of solvent.

2. The low migrate laminating adhesive for food packaging composite film according to claim 1, wherein the at least one alkoxylated diamine is a polyether polyol that, using diamine as a starter, is a polymerization product of ethylene oxide and/or propylene oxide.

3. The low migrate laminating adhesive for food packaging composite film according to claim 1, wherein the at least one alkoxylated diamine is an ethoxylated alkylene diamine and/or a propoxylated alkylene diamine.

4. The low migrate laminating adhesive for food packaging composite film according to claim 1, wherein the at least one alkoxylated diamine is a polyether polyol that, using diamine as a starter, is a polymerization product of ethylene oxide and/or propylene oxide, the diamine being selected from ethylene diamine, N,N-dimethylethylene diamine, N,N'-dimethylethylene diamine, propylene diamine, tetramethylene diamine, hexamethylene diamine, 2,4-toluene diamine, 2,6-toluene diamine, diphenylmethane-2,2'-diamine, diphenylmethane-2,4'-diamine, diphenylmethane-4,4'-diamine, isophorone diamine, dicyclohexylmethane-4,4'-diamine and xylylene diamine.

5. The low migrate laminating adhesive for food packaging composite film according to claim 1, wherein the at least one alkoxylated diamine is a compound of Formula 1:

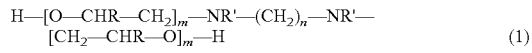

(1)

wherein
   each R is independently selected from H, $CH_3$ and $CH_2$-$CH_3$;
   each R' is independently selected from H and —[$CH_2$—CHR—O$]_m$—H;
   each m, independently, is a whole number from 1 to 10;
   n is a whole number from 1 to 10.

6. The low migrate laminating adhesive for food packaging composite film according to claim 5, wherein the at least one alkoxylated diamine is a propoxylated or ethoxylated/propoxylated ethylene diamine having 2 to 8 units of propylene oxide/ethylene oxide for every unit of ethylene diamine.

7. The low migrate laminating adhesive for food packaging composite film according to claim 1, wherein the curing component contains 1 wt. % to 10 wt. % of the at least one alkoxylated diamine based on the curing component.

8. The low migrate laminating adhesive for food packaging composite film according to claim 1, wherein the curing component polyol comprises a di- and/or tri-functional polyether polyol.

9. The low migrate laminating adhesive for food packaging composite film according to claim 1, wherein the resin component polyol comprises a polyester polyol and polypropylene glycol, and the monomeric polyisocyanate comprises diphenylmethane diisocyanate (MDI).

10. The low migrate laminating adhesive for food packaging composite film according to claim 1, wherein the isocyanate-terminated polyurethane prepolymer does not include a polyether segment in the prepolymer backbone.

11. The low migrate laminating adhesive for food packaging composite film according to claim 1, wherein the mixture comprises up to 30 wt. % of monomeric polyisocyanate based on the total weight of the resin component.

12. The low migrate laminating adhesive for food packaging composite film according to claim 1, wherein the curing component comprises 0.5 wt. % to 20 wt. % of the at least one alkoxylated diamine and 80 wt. % to 99.5 wt. % of the polyol.

13. A composite film, comprising:
   a plastic first film having a first film surface;
   a second film having a second film surface; and
   cured reaction products of the mixed low migrate laminating adhesive for food packaging composite film of claim 1, bonding the first film surface to part or all of the second film surface.

14. The composite film according to claim 13, wherein the second film is a plastic film.

15. The low migrate laminating adhesive for food packaging composite film according to claim 1, wherein cured reaction products of the binder system have a primary aromatic amine content of <0.2 μg when measured in accordance with section 64 of the LFGB.

16. The two component, low migrate laminating adhesive for food packaging composite film of claim 1 being free of catalyst.

17. The cured reaction products of the two component, low migrate laminating adhesive for food packaging composite film of claim 1.

* * * * *

UNITED STATES PATENT AND TRADEMARK OFFICE
CERTIFICATE OF CORRECTION

| | |
|---|---|
| PATENT NO. | : 11,365,278 B2 |
| APPLICATION NO. | : 15/791582 |
| DATED | : June 21, 2022 |
| INVENTOR(S) | : Marcel Blodau, Andre te Poel and Claudia Meckel-Jonas |

It is certified that error appears in the above-identified patent and that said Letters Patent is hereby corrected as shown below:

In the Specification

Column 10, Line 51 change "Example a" to --Example 1a--.

Signed and Sealed this
Twentieth Day of December, 2022

Katherine Kelly Vidal
*Director of the United States Patent and Trademark Office*